US010635604B2

(12) United States Patent
Jiang

(10) Patent No.: US 10,635,604 B2
(45) Date of Patent: Apr. 28, 2020

(54) EXTENDING A CACHE OF A STORAGE SYSTEM

(71) Applicant: EMC Corporation, Hopkinton, MA (US)

(72) Inventor: Lei Jiang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 12 days.

(21) Appl. No.: 15/096,728

(22) Filed: Apr. 12, 2016

(65) Prior Publication Data

US 2016/0335199 A1    Nov. 17, 2016

(30) Foreign Application Priority Data

Apr. 17, 2015 (CN) .......................... 2015 1 01843856

(51) Int. Cl.
| | |
|---|---|
| *G06F 12/128* | (2016.01) |
| *H04L 29/08* | (2006.01) |
| *G06F 12/122* | (2016.01) |
| *G06F 12/0831* | (2016.01) |

(52) U.S. Cl.
CPC ........ *G06F 12/128* (2013.01); *G06F 12/0831* (2013.01); *G06F 12/122* (2013.01); *H04L 67/1095* (2013.01); *H04L 67/1097* (2013.01); *G06F 2212/621* (2013.01)

(58) Field of Classification Search
None
See application file for complete search history.

(56) References Cited

U.S. PATENT DOCUMENTS

| | | | | |
|---|---|---|---|---|
| 7,349,902 | B1 * | 3/2008 | Arlitt | G06F 17/30902 |
| 9,152,599 | B2 | 10/2015 | Blinick et al. | |
| 9,176,759 | B1 * | 11/2015 | Sahasranaman | G06F 9/45558 |
| 9,747,227 | B1 * | 8/2017 | Gambhir-Parekh | G06F 13/28 |
| 2006/0187908 | A1 * | 8/2006 | Shimozono | G06F 16/1824 |
| | | | | 370/363 |
| 2007/0088702 | A1 * | 4/2007 | Fridella | H04L 29/12169 |
| 2007/0208737 | A1 * | 9/2007 | Li | H04L 67/26 |
| 2010/0036949 | A1 * | 2/2010 | Li | H04L 67/322 |
| | | | | 709/225 |
| 2011/0131341 | A1 * | 6/2011 | Yoo | G06F 17/30902 |
| | | | | 709/237 |
| 2011/0191446 | A1 * | 8/2011 | Dazzi | G06F 15/16 |
| | | | | 709/219 |

(Continued)

FOREIGN PATENT DOCUMENTS

CN          101299221          11/2008

*Primary Examiner* — Joshua Joo
(74) *Attorney, Agent, or Firm* — BainwoodHuang

(57) ABSTRACT

Embodiments of the present disclosure provide a method and system for extending a cache of a storage system, by obtaining information on data in a storage system frequently accessed by a plurality of clients of the storage system; determining, based on the obtained information, storage information related to storage of cacheable data in the storage system, the cacheable data comprising a set of the data frequently accessed by the plurality of clients; and synchronizing the storage information amongst the plurality of clients so that a respective client of the plurality of clients locally caches, based on the storage information, data frequently accessed by the respective client.

12 Claims, 12 Drawing Sheets

(56) References Cited

U.S. PATENT DOCUMENTS

| | | | |
|---|---|---|---|
| 2013/0073808 A1* | 3/2013 | Puthalath | H04L 67/1095 |
| | | | 711/119 |
| 2013/0219021 A1* | 8/2013 | Acharya | H04L 29/08729 |
| | | | 709/219 |
| 2014/0007189 A1 | 1/2014 | Huynh et al. | |
| 2014/0282750 A1* | 9/2014 | Civiletto | H04N 21/2747 |
| | | | 725/74 |
| 2015/0169415 A1* | 6/2015 | Hildebrand | G06F 11/201 |
| | | | 714/4.5 |
| 2015/0370490 A1* | 12/2015 | Huici | G06F 3/0611 |
| | | | 711/103 |
| 2016/0105343 A1* | 4/2016 | Janarthanan | H04L 43/0876 |
| | | | 370/252 |
| 2016/0147631 A1* | 5/2016 | Magdon-Ismail | |
| | | | G06F 11/3485 |
| | | | 718/100 |
| 2016/0342542 A1* | 11/2016 | Voigt | G06F 3/06 |
| 2018/0034910 A1* | 2/2018 | Tataroiu | H04L 67/02 |

* cited by examiner

| Table 500 | | | |
|---|---|---|---|
| Server ID | LUN ID | Start Address | Offset |
| $100_1$ | A | 000 | 400 |
| $100_2$ | A | 401 | 800 |
| $100_3$ | C | 100 | 400 |
| $100_4$ | A | 000 | 400 |

Fig. 5

Table 600

| LUN ID | Start Address | Offset |
|--------|---------------|--------|
| A | 000 | 1000 |
| B | 100 | 600 |
| C | 100 | 500 |

EXTENDING A CACHE OF A STORAGE SYSTEM

RELATED APPLICATION

This application claim priority from Chinese Patent Application Number CN2015101843856, filed on Apr. 17, 2015 at the State Intellectual Property Office, China, titled "METHOD AND APPARATUS FOR EXTENDING A CACHE OF A STORAGE SYSTEM," the contents of which is herein incorporated by reference in entirety.

DISCLAIMER

Portions of this patent document/disclosure may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Example embodiments of the present disclosure relates to storage technology.

BACKGROUND OF THE INVENTION

Requirements on storage systems may be increasing including bringing up new challenges with a rapid development of computer hardware and software technology For example, where a plurality of servers may be coupled to a storage system, they might need to share the same batch of large data in the storage system. However, a plurality of servers may perhaps frequently access different subsets of a shared data in a given period of time. Therefore, in order to achieve rapid access to frequently accessed data, each server may require a storage system to store its frequently accessed data in a local cache of the storage system. However, a capacity of a local cache of a storage system may be usually small. When a total amount of frequently accessed data is large, a local cache of a storage system may not be able to hold these data completely.

SUMMARY OF THE INVENTION

Example embodiment of the present disclosure proposes a technical solution for extending a cache of a storage system through centralized scheduling of the storage system by obtaining information on data in a storage system which is frequently accessed by a plurality of clients of the storage system; determining, based on the obtained information, storage information which is related to storage of cacheable data in the storage system, the cacheable data comprising a set of data which is frequently accessed by a plurality of clients; and synchronizing the storage information with a plurality of clients so that a respective client of the plurality of clients locally caches, based on the storage information, data which is frequently accessed by the respective client.

BRIEF DESCRIPTION OF THE DRAWINGS

Through the detailed description of some embodiments of the present disclosure in the accompanying drawings, the features, advantages and other aspects of the present invention will become more apparent, wherein several embodiments of the present invention are shown for the illustration purpose only, rather than for limiting. In the accompanying drawings:

FIG. 5 shows exemplary information on frequently accessed data which is provided in table form;

FIG. 6 shows exemplary storage information that is maintained in table form at a storage system;

DETAILED DESCRIPTION OF EMBODIMENTS

Figure 1:
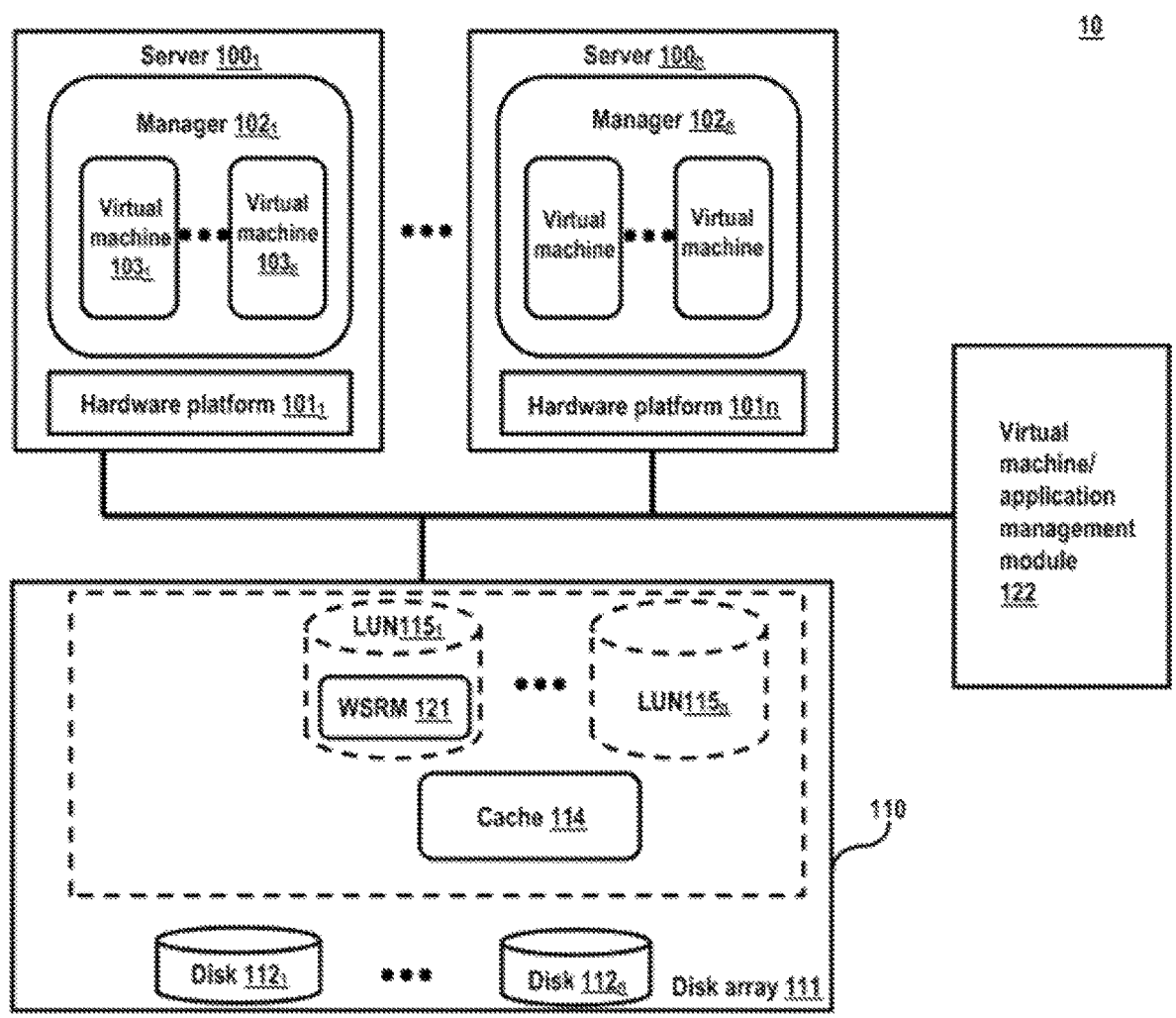
FIG. 1 shows a schematic architecture of an exemplary conventional storage area network.

Principles of the present disclosure are described below by means of several exemplary embodiments as shown in the accompanying drawings. It should be understood that these embodiments are described only for enabling those skilled in the art to better understand and further implement the present disclosure, rather for limiting the scope of the present disclosure in any manner.

It may be noted that the flowcharts and block diagrams in the figures may illustrate the apparatus (system), method, as well as architecture, functions and operations executable by a computer program product according to various embodiments of the present disclosure. In this regard, each block in the flowcharts or block diagrams may represent a module, a program segment, or a part of code, which may contain one or more executable instructions for performing specified logic functions. It should be further noted that in some alternative implementations, functions indicated in blocks may occur in an order differing from the order as illustrated in the figures. For example, two blocks shown consecutively may be performed in parallel substantially or in an inverse order sometimes, which depends on the functions involved. It should be further noted that each block and a combination of blocks in the block diagrams or flowcharts may be implemented by a dedicated, hardware-based system for performing specified functions or operations or by a combination of dedicated hardware and computer instructions.

Generally speaking, all terms used herein should be understood according to their general meanings in the art unless otherwise explicitly stated. All mentioned "a/an/the/said element, device, component, apparatus, unit, step, etc." should be construed as at least one instance of the above element, device, component, apparatus, unit, step, etc., and it is not excluded to comprise a plurality of such elements, devices, components, apparatuses, units, steps, etc., unless otherwise explicitly stated.

One embodiment proposes a technical solution for extending a cache of a storage system through centralized scheduling of the storage system. A further embodiment may include obtaining information on data in a storage system which may be frequently accessed by a plurality of clients of the storage system. A further embodiment may include determining, based on obtained information, storage information which may be related to storage of cacheable data in a storage system. In a further embodiment, cacheable data may include a set of data which may be frequently accessed by a plurality of clients. A further embodiment may include synchronizing a storage information with a plurality of clients so that a respective client of a plurality of clients locally caches, based on the storage information, data which may be frequently accessed by a respective client.

In one embodiment, storage information may at least include identity of a logical unit in a storage system which may be used to store data. A further embodiment may include a range of addresses in a logical unit which may be used to store data. In one embodiment, information on data which may be frequently accessed by a plurality of clients may be obtained from an entity for monitoring access of a plurality of clients to data in a storage system.

One embodiment may include receiving a modification notification message from an entity. In a further embodiment, a modification notification message may indicate a subset of a cacheable data may have been modified. A further embodiment may include identifying clients of a plurality of clients which may share a subset of the data. Yet a further embodiment may include forwarding a modification notification message to identified clients. A further embodiment may include obtaining from entity information a new data in a storage system which may be frequently accessed by one of a plurality of clients. A further embodiment may include updating storage information with information on the new data.

One embodiment may include a method for extending a cache of the storage system. A further embodiment may include obtaining from storage system storage information which may be related to storage of cacheable data in the storage system. In a further embodiment cacheable data may include a set of data in a storage system, which may be frequently accessed by a plurality of clients of the storage system. A further embodiment may include caching, at a respective client of a plurality of clients, based on storage information, data which may be frequently accessed by the respective client.

In one embodiment, caching data which may be frequently accessed by the respective client may include caching data at a local storage device of a respective client. A further embodiment may include building an address map from a storage space of a storage system to storage space of a local storage device. In one embodiment, a subset of a cacheable data may be at least shared by a respective client and another client of a plurality of clients. A further embodiment may include receiving, at a respective client, a modification notification message from a storage system. In a further embodiment, a modification notification message may indicate a subset of data has been modified by another client. A further embodiment may include removing a subset of the data from data which may be cached by a respective client.

One embodiment may include a method for extending a cache of a storage system. A further embodiment may include monitoring access of a plurality of clients of a storage system to data in the storage system. A further embodiment may include providing a storage system with information on data which may be frequently accessed by a plurality of clients. A further embodiment may include a storage system determining, based on the information, storage information which may be related to storage of cacheable data in a storage system. In a further embodiment, cacheable data may include a set of data which may be frequently accessed by a plurality of clients.

In one embodiment, a subset of a cacheable data may be shared by at least two clients of a plurality of clients. A further embodiment may include in response to one of the at least two clients modifying a subset of the data, sending a modification notification message to a storage system. In a further embodiment, a modification notification message may indicate modification to a subset of a data.

One embodiment may include an apparatus, at a storage system, for extending a cache of the storage system. In a further embodiment, an apparatus may include an obtaining unit that may be configured to obtain information on data in a storage system which may be frequently accessed by a plurality of clients of the storage system. In a further embodiment, an apparatus may include a determining unit that may be configured to determine, based on obtained information, storage information which may be related to storage of cacheable data in a storage system. In a further embodiment, cacheable data may include a set of data which may be frequently accessed by a plurality of clients. In a further embodiment, an apparatus may include a synchronizing unit that may be configured to synchronize storage information to a plurality of clients so that a respective client of a plurality of clients locally caches, based on storage information, data which may be frequently accessed by a respective client.

In one embodiment, storage information may at least include identity of a logical unit in a storage system which may be used to store data. A further embodiment may include a range of addresses in a logical unit which may be used to store the data. In one embodiment, an obtaining unit may be further configured to obtain information on data which may be frequently accessed by a plurality of clients from an entity for monitoring access of a plurality of clients to data in a storage system. In one embodiment, an apparatus may further include a receiving unit that may be configured to receive a modification notification message from an entity. In a further embodiment, a modification notification message may inculcate a subset of cacheable data may have been modified. A further embodiment may include an identifying unit that may be configured to identify clients of a plurality of clients which may share a subset of the data. A further embodiment may include a forwarding unit that may be configured to forward a modification notification message to identified clients.

In one embodiment, an obtaining unit may be further configured to obtain from entity information, new data in a storage system which may be frequently accessed by one of a plurality of clients. A further embodiment may include a determining unit that may be further configured to update storage information with information on a new data.

One embodiment may include an apparatus, at a client of a storage system, for extending a cache of a storage system. In a further embodiment, an apparatus may include a storage information obtaining unit that may be configured to obtain from a storage system storage information which may be related to storage of cacheable data in a storage system. In a further embodiment, cacheable data may include a set of data in a storage system, which may be frequently accessed by a plurality of clients of a storage system. In a further embodiment, a caching unit may be configured to cache, at a respective client of a plurality of clients and based on storage information, data which may be frequently accessed by a respective client.

In one embodiment, caching unit may be further configured to cache data at a local storage device of a respective client. In a further embodiment, storage information obtaining unit may be further configured to build an address map from storage space of a storage system to storage space of a local storage device. In one embodiment, a subset of cacheable data may at least be shared by a respective client and another client of a plurality of clients. In a further embodiment, storage information obtaining unit may be further configured to receive, at a respective client, a modification notification message from a storage system. In a further embodiment, a modification notification message may indicate that a subset of the data may have been modified by another client. In a further embodiment, a caching unit may be further configured to remove a subset of the data from data which may be cached by a respective client.

One embodiment may include an apparatus for extending a cache of a storage system. In a further embodiment, an apparatus may include a monitoring unit that may be configured to monitor access of a plurality of clients of a storage system to data in a storage system. In a further embodiment an information providing unit may be configured to provide a storage system with information on data which may be frequently accessed by a plurality of clients. In a further embodiment, a storage system determines, based on obtained information, storage information which may be related to storage of cacheable data in a storage system. In a further embodiment, cacheable data may include a set of data which may be frequently accessed by a plurality of clients.

In one embodiment, a subset of cacheable data may be shared by at least two clients of a plurality of clients. In a further embodiment, an apparatus may further include a notifying unit that may be configured to, in response to one of at least two clients modifying a subset of data, send a modification notification message to a storage system. In a further embodiment, a modification notification message may indicate modification to a subset of data.

One embodiment may include a computer program product, the computer program product being tangibly stored on a non-transient computer readable storage medium and may include machine executable instructions which, when executed, cause a machine to execute steps of methods according to embodiments of the disclosure mentioned above.

In a further embodiment, with a solution as proposed by the present disclosure, clients (i.e., servers) of a storage system may locally cache data, which may be frequently accessed by a respective client, through a centralized scheduling and coordination of a storage system, thereby extending a local cache of the storage system. In a further embodiment, a local limited cache of a storage system may support more virtual machines and/or applications to run on the same client. In a further embodiment, workload of a processor of a storage system may be reduced by locally reading frequently accessed data from a client. In an addition embodiment, existing client-side software such as Power-Path™ provided by a storage system's manufacturer may be used to achieve client-side operations, without increasing software management load at the client side.

Reference is now made to FIG. 1, which shows an illustrative architecture of an exemplary conventional storage area network 10. As shown in FIG. 1, storage area network 10 includes servers $100_1, \ldots, 100_n$ (collectively called "server 100"), storage system 110 and virtual machine/application management module 122. Server 100 may be coupled to storage system 110 via a communication medium. Storage system 110 includes disk array 111 for storing data. Disk array 111 includes physical disks $112_1, \ldots, 112_n$ (collectively called "disk 112"). Storage system 110 further includes logical units $115_1, \ldots, 115_n$ that result from virtualizing physical disks $112_1, \ldots, 112_n$. A LUN (logical unit number) is a number assigned to each logical unit. Logical units $115_1, \ldots, 115_n$ are also referred to as LUN $115_1, \ldots, 115_n$ (collectively called "LUN 115"). To enable rapid access to frequently accessed data, storage system 110 further includes cache 114, which is often implemented as one part of a memory (not shown) of storage system 110.

Virtual machine/application management module 122 communicates with servers $100_1, \ldots, 100_n$ and storage system 110 so as to achieve unified management of various servers 100 and storage system 110. Virtual machine/application management module 122 may be implemented as a module that is independent of various servers 100 and storage system 110. For example, virtual machine/application management module 122 is implemented on a server that is independent of various servers 100 and storage system 110. Alternatively, virtual machine/application management module 122 may also be implemented on one of servers $100_1, \ldots, 100_n$. For the clarity purpose, FIG. 1 shows only one virtual machine/application management module 122. However, in view of concrete application scenarios, a plurality of virtual machine/application management modules 122 may be disposed in a storage area network.

Each server 100 comprises hardware platform 101. Details of hardware platform 101 may be described hereinafter. Each server 100 has hypervisor 102 installed thereon, which dynamically and transparently allocates hardware resources of servers 100 to each virtual machine 103 on each server 100. Some of servers $100_1, \ldots, 100_n$ share storage space on one or more LUNs 115 and thus might share data on one or more LUNs 115. For example, some of servers $100_1, \ldots, 100_n$ may share data 121 on LUN $115_1$. Data 121 may be data that is frequently accessed by the some servers respectively.

In a period of time, some servers might frequently access different subsets of shared data 121 respectively. To enable rapid access to frequently accessed data, each of the several servers desires storage system 110 store subsets of frequently accessed data 121 in local cache 114 of storage system 110. However, the capacity of cache 114 is usually small. When the amount of data 121 is huge/large, cache 114 cannot completely hold the data. Therefore, a processor (not shown) of storage system 110 will update data in cache 114 according to a predefined rule, for example, update data according to the LRU (least recently used) algorithm, etc. Therefore, when there are many servers sharing data 121, the processor of storage system 110 will frequently perform data inputs and outputs with respect to cache 114, thereby consuming huge computing resources of the processor.

Alternatively, virtual machines $103_1, \ldots, 103_n$ (collectively called virtual machine 103) can run on a single server 100 and share resources on server 100. For example, some virtual machines of virtual machines $103_1, \ldots, 103_n$ may share the same operating system image on a single server 100. Therefore, it is desirable to cache at a client (i.e., server 100) of storage system 110 data that is frequently accessed by the respective client, so as to extend the local cache of storage system 110. In addition, it is desirable that storage system 110 schedules/coordinates which data can be cached at a client, and it is desirable that storage system 110 synchronizes among various clients the storage information on cacheable data. Further, it is desirable not to increase the software management workload at client side of storage system 110.

In one example embodiment, communication medium may be the Internet, intranet or any other wired or wireless connection. In a further embodiment, server may access and communicate with storage system by means of the communication medium, for example, for performing data reads, write requests or other I/O (input/output) operations. In a further embodiment, throughout the context of the present disclosure, server acts as a requester for data while storage system acts as a provider of data. In a further embodiment, server may also referred to as "client of the storage system", which may be used interchangeably with each other. In a further embodiment, a LUN may refer to any device which supports read/write operations, such as a tape drive, a disk, a solid-state disk, but may be most often used to refer to a logical disk as created in a storage area network. In a further embodiment, a LUN may be an actual logical identifier for a set of storage locations on one or more physical storage devices (e.g., disks), the term "LUN" is often also used to refer to the logical disk itself. In a further embodiment, a Hypervisor may be commercially available virtualization software such as VMware® vSphere™, Microsoft Hyper-V and the like.

In one embodiment, "frequently accessed data" refers to data that may be accessed in an access frequency higher than a predetermined threshold during a specific period of time. In an example embodiment, if access to some data exceeds 4 times (i.e., predetermined threshold) in a week, it may be considered the data is "frequently accessed data". In an example embodiment, "frequently accessed data" may include but may not be limited to: WSRM (write seldom, read many) data, and WORM (write once, read many) data. In an example embodiment, "frequently accessed data" may include system files of the operating system, such as VDI (virtual desktop infrastructure) master images. In a further embodiment, when each of a plurality of virtual machines boots or its user logs in, each virtual machine may need to access a same system file from a storage system via a network that may be used to couple a server to a storage system, thereby increasing the network's workload.

Figure 2:
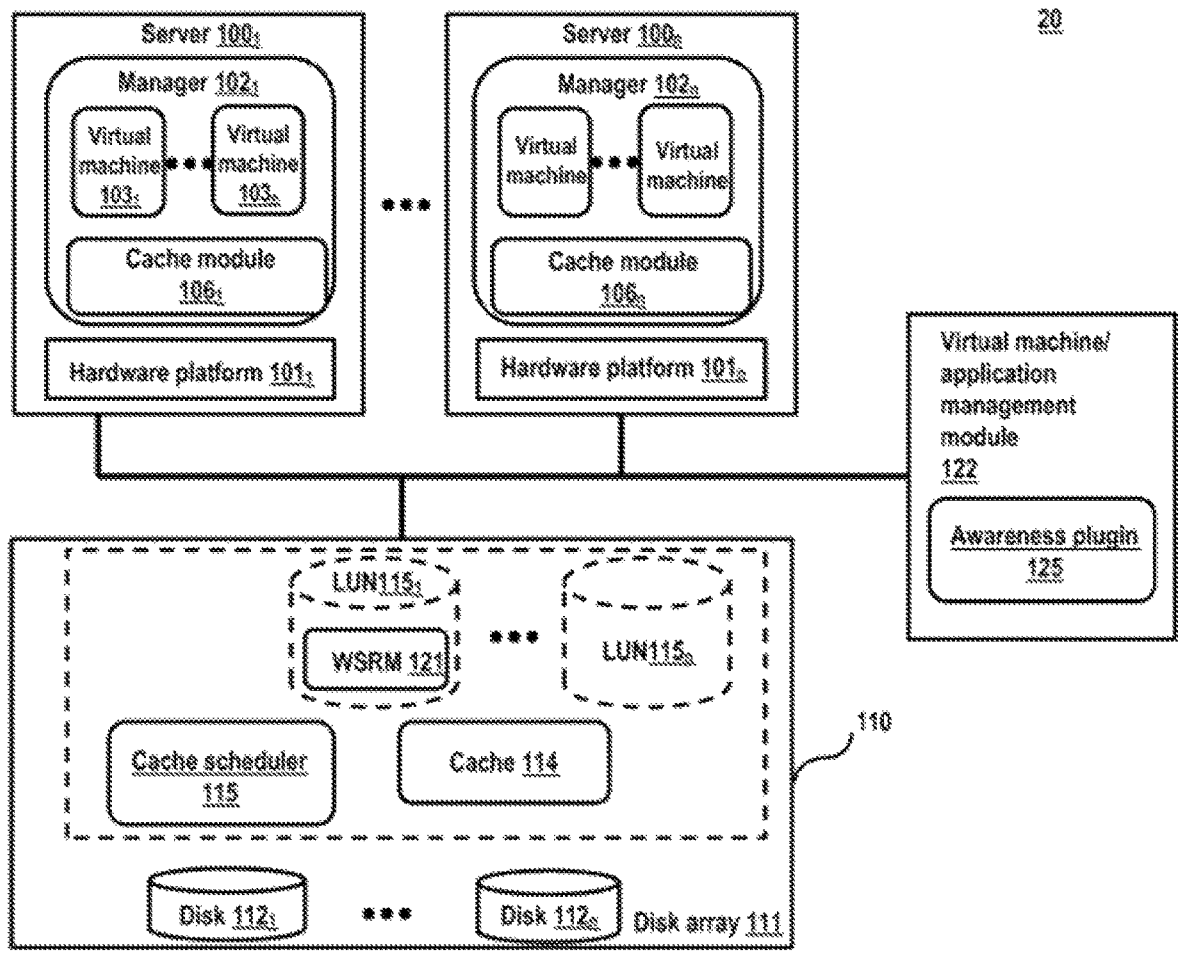
FIG. 2 shows a schematic architecture of an exemplary storage area network according to one embodiment of the present disclosure.

To this end, the present disclosure proposes a technical solution for extending a cache of a storage system through unified scheduling of a storage system. FIG. 2 shows a schematic architecture of a storage area network 20 according to one embodiment of the present disclosure. As can be seen from a comparison between FIG. 2 and FIG. 1, the architecture of storage area network 20 shown in FIG. 2 differs from the architecture of storage area network 10 shown in FIG. 1 in three aspects: (1) storage system 110 further comprises cache scheduler 115, (2) servers $100_1, \ldots, 100_n$ further include cache modules $106_1, \ldots,$ $106_n$ (collectively called cache module 106) respectively, and (3) virtual machine/application management module 122 further include awareness plugin 125. It may be understood that one or several of cache scheduler 115, cache module 106 and awareness plugin 125 are configured to implement the solution for extending a cache of a storage system according to the present disclosure. With reference to FIGS. 3 to 8, description will be presented below to operations to cache scheduler 115, cache module 106 and awareness plugin 125.

Figure 3:
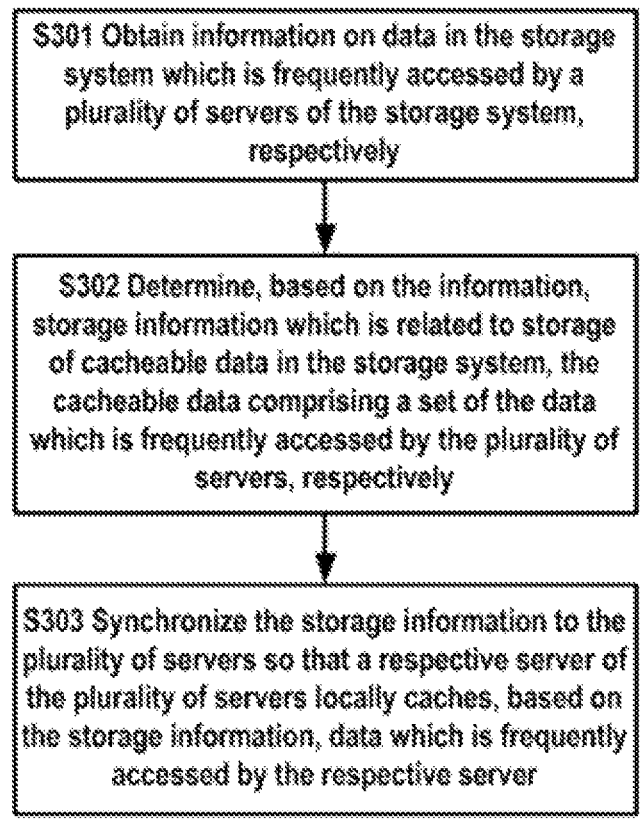
FIG. 3 shows a flowchart of a method, executed at a storage system, for extending a cache of the storage system according to one exemplary embodiment of the present disclosure.

FIG. 3 shows a flowchart of an exemplary method 300, executed at a storage system, for extending a cache of the storage system according to one embodiment of the present disclosure. In one embodiment, method 300 may be executed by cache scheduler 115 in storage system 110 as shown in FIG. 2. However, it should be understood that method 300 may also be executed by other appropriate module in storage system 110.

Figure 4:
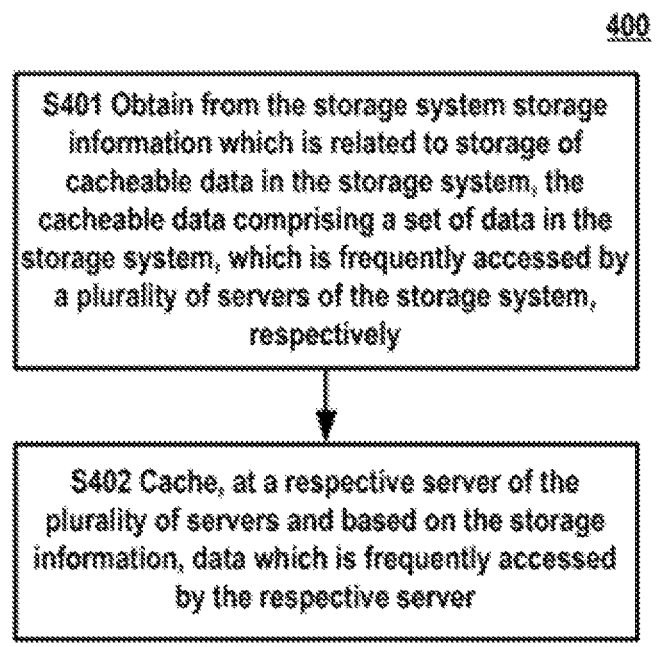
FIG. 4 shows a flowchart of a method, executed at a server, for extending a cache of the storage system according to one exemplary embodiment of the present disclosure.

FIG. 4 shows an exemplary flowchart of a method, executed at server 100, for extending a cache of a storage system according to one embodiment of the present invention. In one embodiment, method 400 may be executed by cache module 106 in server 100 as shown in FIG. 2. However, it should be understood that method 400 may also be executed by other appropriate module in server 100.

With first reference to FIG. 3, in step S301, storage system 110 obtains information on data in storage system 110 which is frequently accessed by a plurality of servers, the information indicating a storage location of data frequently accessed by a plurality of servers in storage system 110. In step S302, storage system 110 determines storage information which is related to storage of cacheable data in storage system 110, based on the information on data frequently accessed by a plurality of servers 100, the cacheable data comprising a set of the data frequently accessed by the plurality of servers. In step S303, storage system 110 synchronizes the determined storage information to the plurality of servers 100, so that a corresponding server of the plurality of servers 100 locally caches data frequently accessed by the corresponding server, based on the storage information.

With reference to Step S301, in one embodiment since storage system 110 does not have the information on data frequently accessed by a plurality of servers, storage system 110 obtains information from an entity for monitoring access by a plurality of servers to data in storage system 110. In a further embodiment, the entity may be implemented on a server that is independent of servers 100 and storage system 110. In an alternate embodiment, the entity may also be implemented on one of servers $100_1, \ldots, 100_n$. For details of the entity, description will be presented with reference to FIG. 8 below.

In a further embodiment, where physical disks $112_1, \ldots, 112_n$ of storage system 110 are virtualized as corresponding logical units $115_1, \ldots, 115_n$, information on data frequently accessed by a plurality of servers may include identities of servers (server IDs) and addresses of logical units for storing data frequently accessed by a plurality of servers. In a further embodiment, addresses of logical units for example may include: identities of LUNs (LUN IDs), start addresses on the LUNs for storing the data, and offsets relative to the starting addresses. In a further embodiment, storage system 110 may obtain, from an entity for monitoring, information on data frequently accessed by a plurality of servers which may be provided in any appropriate form.

FIG. 5 illustrates information provided in table form. Table 500 comprises the following record entries: identity of a server (server ID), identity of LUN (LUN ID), a start address and offset. As can be seen from Table 500, data frequently accessed by server $100_1$ is stored in an address range between 002 and 010 on LUN A. Data frequently accessed by server $100_2$ is stored in an address range between 401 and 800 on LUN A. Data frequently accessed by server $100_3$ is stored in an address range between 100 and 400 on LUN C. Data frequently accessed by server $100_4$ is also stored in an address range between 002 and 010 on LUN A, just like server $100_1$. In other words, server $100_4$ and server $100_1$ share data in an address range between 000 and 400 on LUN A. However, it should be understood where physical disks $112_1, \ldots, 112_n$ of storage system 110 are not virtualized, the above information may include addresses of physical devices (e.g., physical disks) for storing data frequently accessed by a plurality of servers.

Still with reference to FIG. 3, in step S302, storage system 110 determines storage information which is related to storage of cacheable data in storage system 110, based on the information on data frequently accessed by a plurality of servers 100, the cacheable data comprising a set of the data frequently accessed by the plurality of servers. In one embodiment, storage information may at least include: identities of logical units in storage system 110 for storing data, and an address range in the logical units for storing the data. In a further example embodiment, addresses of logical units may include, identities of LUNs (LUN IDs), start addresses on the LUNs for storing the data, and offsets relative to the start addresses. In a further embodiment, after storage information related to storage of cacheable data in storage system 110 is determined, storage system 110 may consolidate the storage information on data frequently accessed by a plurality of servers.

In an example embodiment, as described above, some of servers $100_1, \ldots, 100_n$ might share data on one or more LUNs, whereas data might be data frequently accessed by one or more of some of these servers. In an example embodiment, as described with reference to FIG. 5, server $100_4$ and server $100_1$ may share data in an address range between 000 and 400 on LUN A. In a further embodiment, while determining cacheable data, storage system 110 may only consider data frequently accessed by server $100_4$ and server $100_1$. In a further embodiment, while determining storage information related to storage of a cacheable data in storage system 110, storage system 110 may only consider storage information on data frequently accessed by server $100_4$ and server $100_1$.

In an example embodiment, still considering the example of FIG. 5, data frequently accessed by server $100_1$ may be stored in an address range between 002 and 010 on LUN A, while data frequently accessed by server $100_2$ may be stored in an address range between 401 and 800 on LUN A. In a further embodiment, while determining storage information, storage system 100 may consolidate address ranges on the same LUN, thus determining an address range between 100 and 800 on LUN A as one of the above storage information. In an additional embodiment, storage system 110 may maintain storage information that may be determined to be in any appropriate form.

FIG. 6 illustrates that storage information is maintained in the form of table 600 in storage system 110. As shown in this figure, table 600 includes the following record entries: identity of LUN (LUN ID), a start address and offset. As shown in table 600, data that can be locally cached by server 100 includes, for example, data stored in an address range 000 and 10 on LUN A. In one embodiment, it should be understood that table 600 may not exhaustively enumerate storage information on cacheable data, but may show only one part thereof. In an alternate embodiment, storage system 110 may create a bitmap based on determined storage information, thereby maintaining a determined storage information in bitmap form. In a further embodiment, creating of a bitmap based on a determined storage information may be implemented in a familiar way to those skilled in the art, which is not detailed here.

Returning to FIG. 3, in step S303, storage system 110 synchronizes the determined storage information to the plurality of servers 100, so that a corresponding server of the plurality of servers 100 locally caches data frequently accessed by the corresponding server, based on the storage information. In one embodiment, it should be understood the synchronization mentioned here may mean that storage information stored in storage system 110 may be kept consistent with storage information stored in server 100 at any time. In one embodiment, storage system 110 may synchronize a determined storage information to a plurality of servers 100 in a form of table (e.g., table 600). In another embodiment, storage system 110 may synchronize a determined storage information to a plurality of servers 100 in a form of the corresponding bitmap.

Now with reference to FIG. 4, in correspondence with step S303 in FIG. 3, in step S401, server 100 obtains from storage system 110 storage information related to storage of cacheable data in the storage system. Next in step S402, data frequently accessed by a corresponding server of the plurality of servers 100 is cached in the corresponding server based on the obtained storage information.

Figure 7:
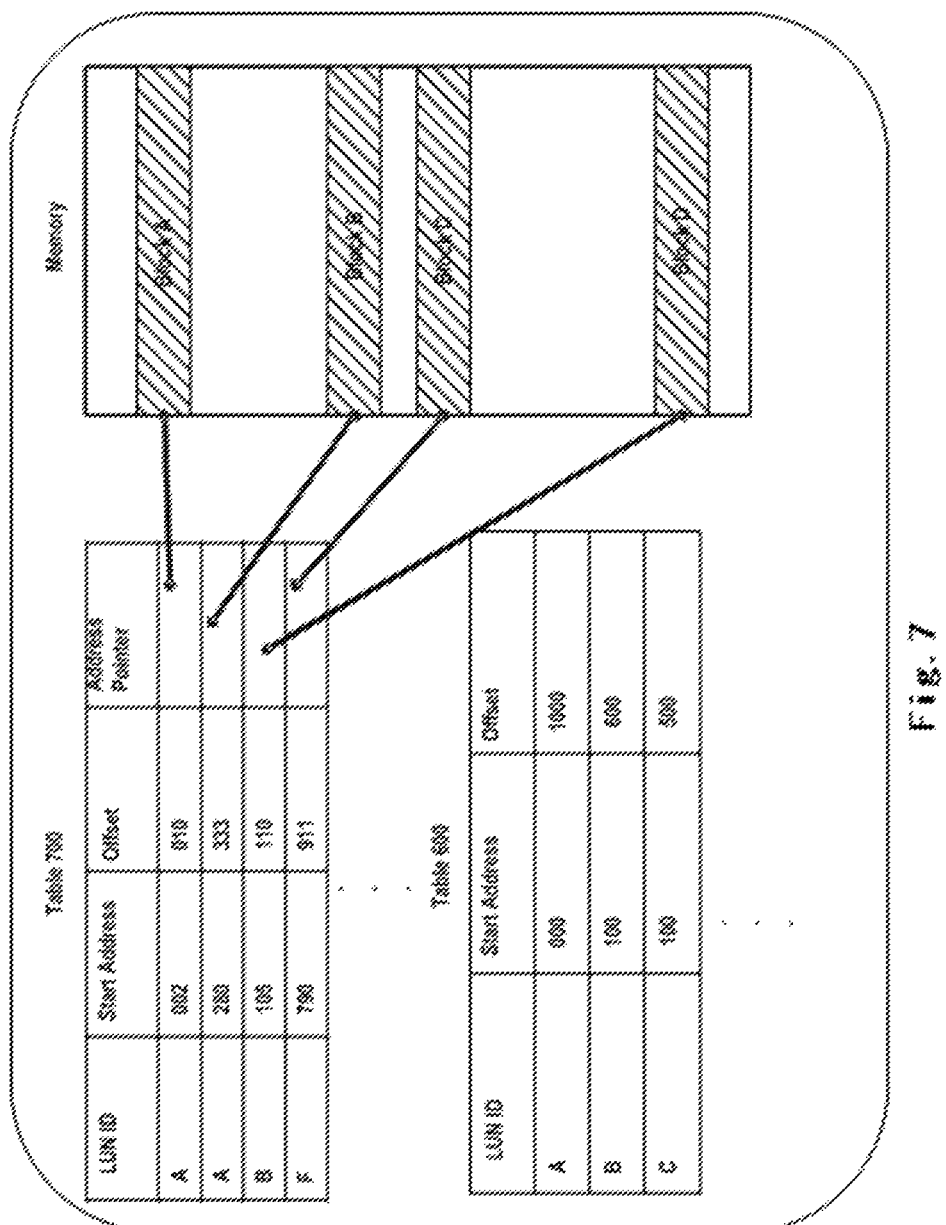
FIG. 7 shows exemplary address mapping from storage space of a storage system to storage space of a local storage device of a client.

In one embodiment, as described above, cacheable data may include a set of data frequently accessed by a plurality of servers 100 and may be stored in storage system 110. In one embodiment, server 100 may obtain, from storage system 110, storage information that may be provided in table form (e.g., table 600), and may locally stores the table, as shown in FIG. 7. In another embodiment, server 100 may obtain, from storage system 110, storage information that may be provided in bitmap form.

In one embodiment, caching data frequently accessed by a corresponding server may include caching data in a local storage device of a corresponding server. In a further embodiment, a local storage device may include, but is not limited to, a memory, a solid-state disk (SSD), a flash memory, etc. In one embodiment, caching data frequently accessed by a corresponding server may further include building an address map from a storage space of a storage system to a storage device of a local storage device. In one embodiment, server 100 may build an address map from a storage space of a storage system to a storage space of a local storage device in any appropriate form.

FIG. 7 illustrates one example of an address map built in the form of a table 700 in server 100. As shown in table 700, this table includes a plurality of records, each of which includes the following record entries: identity of LUN (LUN ID), a start address, offset and an address pointer. The address pointer is used to indicate a storage address of cached data in a memory of server 100. Table 700 shows clearly which data in storage system 110 is cached in a local memory of server 100 and a storage address of the cached data in the memory.

Initially, table 700 does not contain any data. When a virtual machine and/or application on server 100 is started, in response to a request for accessing data, the virtual machine and/or application queries table 700 to determine whether or not desired data is already cached locally. If yes, the virtual machine and/or application obtains desired data from the storage location indicated in table 700. And, if not, table 600 is further queried to determine whether or not desired data belongs to cacheable data. If the desired data belongs to cacheable data, the virtual machine and/or application obtains the desired data from storage system 110, caches the desired data in a local memory of storage system 110, and builds an address map from storage space of storage system 110 to storage space of the local memory with respect to the desired data, for example creating a record in the first row of table 700.

Figure 8:
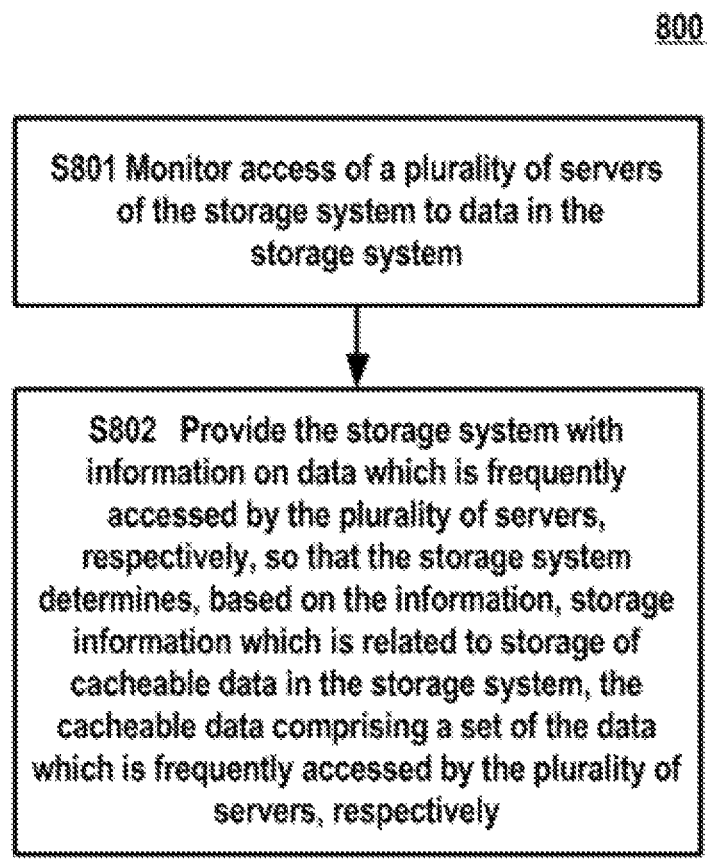
FIG. 8 shows a flowchart of a method for extending a cache of a storage system according to another exemplary embodiment of the present disclosure.

FIG. 8 shows a flowchart of a method 800 for extending a cache of a storage system as executed at virtual machine/application management module 122 in FIG. 2 according to one exemplary embodiment of the present disclosure. Method 800 is executed by awareness plugin 125 in virtual machine/application management module 122 in FIG. 2. However, it should be understood method 800 may also be executed by other appropriate module in virtual machine/application management module 122. As shown in FIG. 8, in step S801, awareness plugin 125 monitors access of a plurality of servers 100 to data in storage system 110. In step S802, awareness plugin 125 provides storage system 110 with information on data frequently accessed by a plurality of servers 100, so that storage system 110 determines, based on the information, storage information related to storage of cacheable data in storage system 110, the cacheable data including a set of data frequently accessed by the plurality of servers 100.

In one embodiment, monitoring access to data may include monitoring the type of access, for example. In a further embodiment, type of access may be read, write, synchronize, delete, copy, etc. In a further embodiment, by monitoring access to data, awareness plugin 125 may learn characteristics of access-related data and usage of data. In a further embodiment, characteristics of data may comprise the type of data and content of data.

The description, presented above with reference to FIGS. 3-7, of information on data frequently accessed by the plurality of servers 100 and of cacheable data is also applicable to the embodiment shown in FIG. 8, which is thus not detailed here. In some embodiments, as described above, a subset of cacheable data may be shared by at least two of the plurality of servers 100. In an example embodiment, as described with reference to FIG. 5, server $100_4$ and server $100_1$ share data may be in an address range between 000 and 400 on LUN A. In one embodiment, in response to one of the at least two servers modifying a subset of data, awareness plugin 125 may send a modification notification message to storage system 110. In a further embodiment, a modification notification message may indicate modification to the subset of the data. In an example embodiment, a system file of an operating system may be updated regularly or irregularly. In a further embodiment, where cacheable data includes the system file of an operating system, when s system file is updated, awareness plugin 125 may send a modification notification message to storage system 110 in response to the updating.

In a further embodiment, storage system 110 may receive a modification notification message from awareness plugin 125. In a further embodiment, storage system 110 may identify a server of a plurality of servers which may share a subset of data with one of the at least two servers. In a further embodiment, storage system 110 may forward a modification notification message to an identified server. In a further embodiment, in response to receiving a modification notification message, an identified server may remove a subset of data from data that may be cached locally.

In one embodiment, when awareness plugin 125 identifies new data that may be frequently accessed by one of the plurality of servers 100, awareness plugin 125 may send information on the new data to storage system 110. In a further embodiment, in response to receiving information on a new data, storage system 110 may use information on the new data to update locally stored storage information related to cacheable data, for example to update table 600. In a further additional embodiment, storage system 110 may further synchronize updated storage information to various servers 100.

Figure 9:
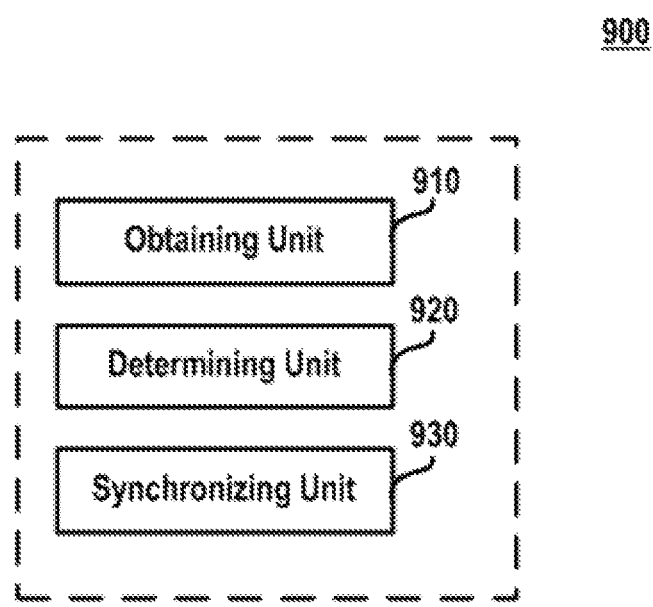
FIG. 9 shows a block diagram of an apparatus for extending a cache of a storage system according to one exemplary embodiment of the present disclosure.

The embodiments of the present disclosure further provide an apparatus for extending a cache of a storage system as implemented at the exemplary storage system. FIG. 9 shows a block diagram of apparatus 900 for extending a cache of a storage system according to one embodiment of the present disclosure. In one embodiment, apparatus 900 is implemented at storage system 110 shown in FIG. 2. As shown in FIG. 9, apparatus 900 includes: an obtaining unit 910 configured to obtain information on data in the storage system which is frequently accessed by a plurality of clients of the storage system, respectively; a determining unit 920 configured to determine, based on the obtained information, storage information which is related to storage of cacheable data in the storage system, the cacheable data including a set of the data which is frequently accessed by a plurality of clients, respectively; and a synchronizing unit 930 configured to synchronize the storage information to a plurality of clients so that a respective client of the plurality of clients locally caches, based on the storage information, data which is frequently accessed by the respective client.

In one embodiment, the storage information may at least include identity of a logical unit in a storage system which may be used to store data; and a range of addresses in a logical unit which may be used to store the data. In one embodiment, obtaining unit may be further configured to obtain information on data that is frequently accessed by a plurality of clients respectively, from an entity for monitoring access of a plurality of clients to data in a storage system.

In one embodiment, apparatus 900 may further include: a receiving unit that may be configured to receive a modification notification message from an entity. In a further embodiment, a modification notification message may indicate a subset of a cacheable data is modified. A further embodiment may include an identifying unit that may be configured to identify clients of a plurality of clients which share a subset of the data. A further embodiment may include a forwarding unit that may be configured to forward a modification notification message to identified clients. IN one embodiment, obtaining unit may be further configured to obtain from an entity, information on new data in a storage system that is frequently accessed by one of a plurality of clients. In a further embodiment, determining unit may be further configured to use information on a new data to update a storage information.

Figure 10:
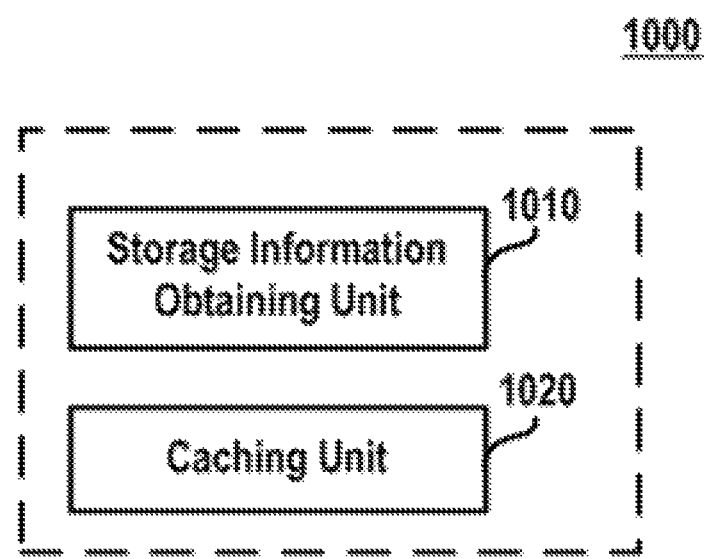
FIG. 10 shows a block diagram of an apparatus for extending a cache of a storage system according to another exemplary embodiment of the present disclosure.

The embodiments of the present disclosure further provide an apparatus for extending a cache of a storage system as implemented at a client of the storage system. FIG. 10 shows a block diagram of apparatus 1000 for extending a cache of a storage system according to one embodiment of the present disclosure. In one embodiment, apparatus 1000 is implemented at server 100 shown in FIG. 2. As shown in FIG. 10, apparatus 1000 includes a storage information obtaining unit 1010 configured to obtain from a storage system storage information which is related to storage of cacheable data in the storage system, the cacheable data including a set of data in the storage system, which is frequently accessed by a plurality of clients of the storage system, respectively. A further embodiment may include a caching unit 1020 configured to cache, at a respective client of the plurality of clients and based on a storage information, data which is frequently accessed by respective clients. In one embodiment, caching unit 1020 is further configured to cache the data in a local storage device of respective clients, and storage information obtaining unit 1010 is further configured to build an address map from storage space of the storage system to storage space of the local storage device. In one embodiment, a subset of a cacheable data may at least be shared by respective clients and another client of a plurality of clients. In a further embodiment, storage information obtaining unit may be further configured to receive, at a respective client, a modification notification message from a storage system. In a further embodiment, a modification notification message may indicate that a subset of the data may have been modified by another client. In a further embodiment, caching unit may be further configured to remove a subset of data from data cached in a respective client.

Figure 11:
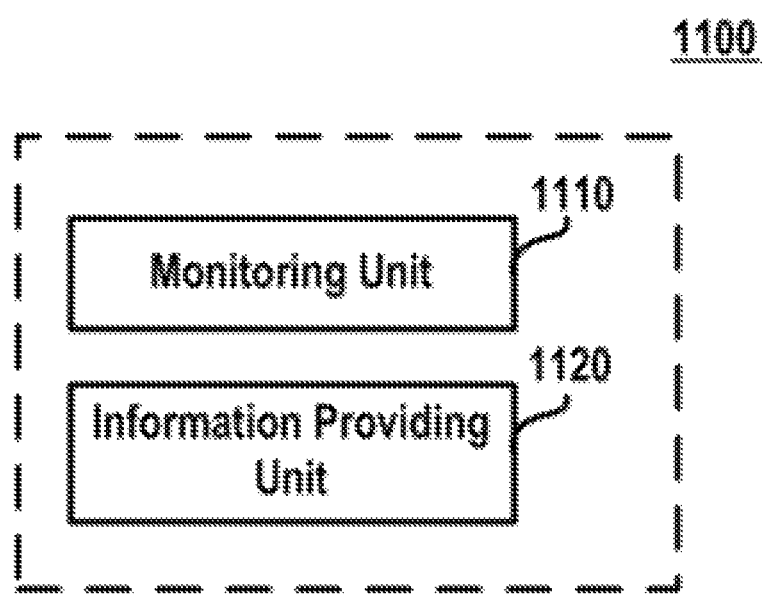
FIG. 11 shows a block diagram of an apparatus for extending a cache of a storage system according to a further embodiment of the present invention.

The embodiments of the present disclosure further provide an apparatus for extending a cache of the storage system as implemented at an entity for monitoring access to data in the storage system. FIG. 11 shows a block diagram of apparatus 1100 for extending a cache of a storage system according to one exemplary embodiment of the present disclosure. In one embodiment, apparatus 1100 is implemented at virtual machine/application management module 122 shown in FIG. 2. As shown in FIG. 11, apparatus 1100 includes: a monitoring unit 1110 configured to monitor access of a plurality of clients of the storage system to data in the storage system; and an information providing unit 1120 configured to provide the storage system with information on data which is frequently accessed by the plurality of clients, respectively, so that the storage system determines, based on the information, storage information which is related to storage of cacheable data in the storage system, the cacheable data comprising a set of data which is frequently accessed by the plurality of clients.

In one embodiment, a subset of the cacheable data may be shared by at least two clients of the plurality of clients. Apparatus 1100 may further include a notifying unit that may be configured to, in response to one of at least two clients modifying a subset of data, send a modification notification message to a storage system. In a further embodiment, a modification notification message may indicate modification to a subset of data. In one embodiment, each individual unit in FIG. 9, 10 and 11 may be combined into a single unit which may be configured to perform the tasks of the individual units so as to attain the end result as desired by the embodiments of the present disclosure.

Figure 12:
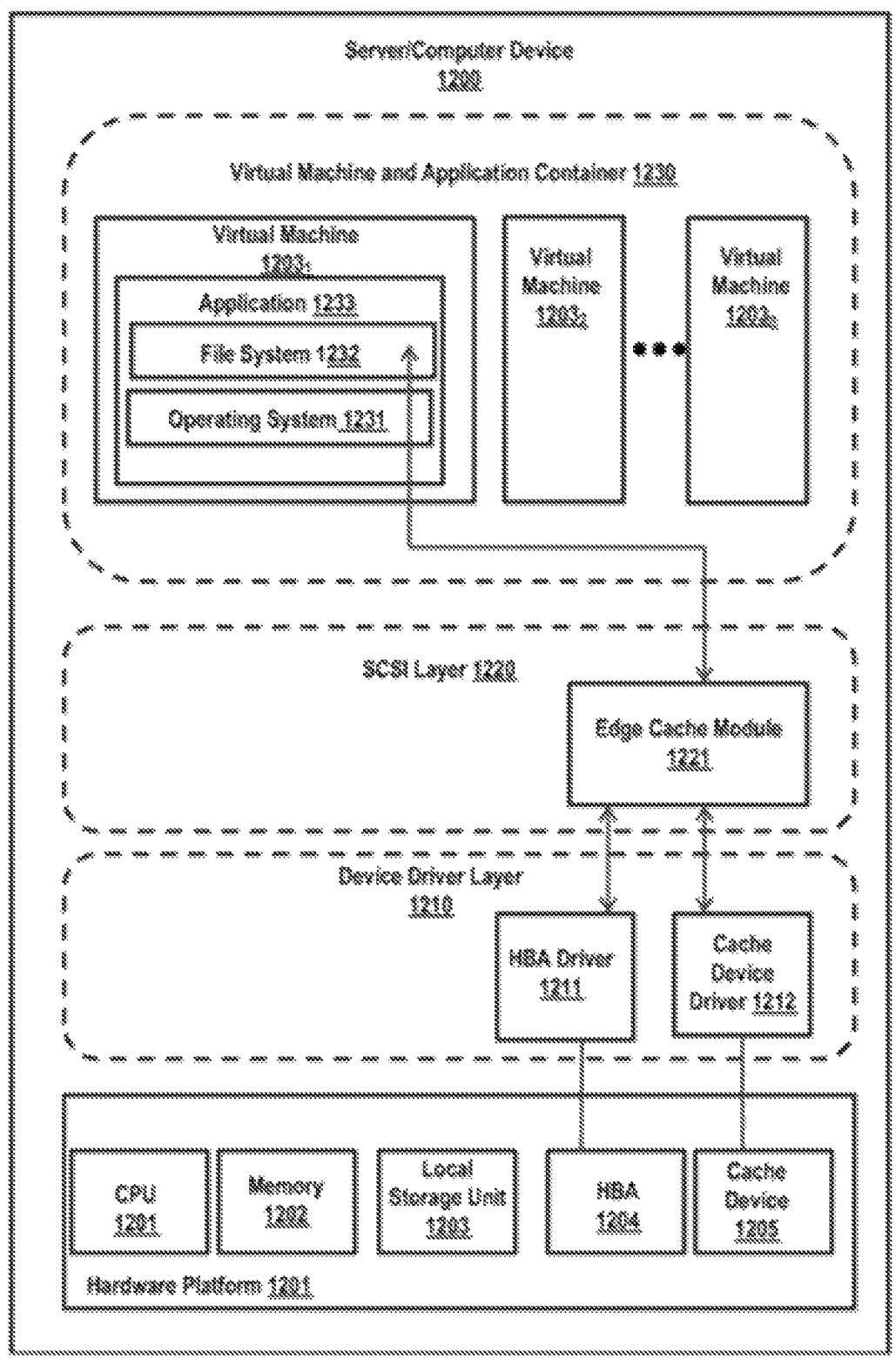
FIG. 12 shows a schematic block diagram of a server/computer system which is applicable to implement the exemplary embodiments of the present disclosure.

FIG. 12 shows a schematic block diagram of a server/computer device 1200 which is applicable to implement the embodiments of the present disclosure. For example, server/computer device 1200 shown in FIG. 12 may be used to implement apparatus 1000 for extending a cache of a storage system as described with reference to FIG. 10. As shown in FIG. 12, server/computer device 1200 includes: virtual machine and application container 1230, SCSI layer 1220, device driver layer 1210 and hardware platform 1201. Virtual machine and application container 1230 includes virtual machines $1203_1$, $1203_2$, ..., $1203_n$ (collectively called virtual machine 1203). File system 1232 is installed on virtual machine 1203. In addition, operating system 1231 and application 1233 are running on virtual machine 1203. SCSI layer 1220 includes an edge cache module 1221. Device driver layer 1210 comprises HBA driver 1211 and cache device driver 1212.

Hardware platform includes CPU 1201, memory 1202, local storage unit 1203, HBA 1204 and cache device 1205. Local storage unit 1203 includes, but is not limited to, SSD, a flash memory, etc. Although cache device 1205, memory 1202 and local storage unit 1203 are shown as separate modules in FIG. 12, cache device 1205 may be implemented as one part of local storage unit 1203 or memory 1202.

In one embodiment, edge cache module 1221, cache device driver 1212 and cache device 1205 may be implemented in cache module 106 shown in FIG. 2. In one embodiment, edge cache module 1221 may obtain from storage system 110 storage information related to storage of cacheable data in a storage system, the cacheable data may include a set of data frequently accessed by a plurality of servers. In one embodiment, edge cache module 1221 may maintain all obtained storage information in the form as illustrated in table 600. In one embodiment, edge cache module 1221 may cache, based on storage information, data frequently accessed by server 1200 in cache device 1205. In one embodiment, edge cache module 1221 may build an address map from storage space of storage system 110 to storage space of cache device 1205. In one embodiment, edge cache module 1221 may build an address map in the form as illustrated in table 700.

In one embodiment, a subset of cacheable data may be shared at least by server 1200 and another server. In one embodiment, edge cache module 1221 may receive a modification notification message from storage system 110. In a further embodiment, a modification notification message may indicate that a subset of data may have been modified by another server. In one embodiment, edge cache module 1221 may remove a subset of data from data cached in cache device 1205 in response to receiving a modification notification message.

In particular, according to the embodiments of the present disclosure, the process as described above with reference to FIGS. 3, 4 and 8 may be implemented as a computer software program. For example, the embodiments of the present disclosure include a computer program product, which includes a computer program tangibly embodied on a machine-readable medium. The computer program includes program code for performing methods 300, 400 and 800.

Generally, various exemplary embodiments of the present disclosure may be implemented in hardware or application-specific circuit, software, logic, or in any combination thereof. Some aspects may be implemented in hardware, while the other aspects may be implemented in firmware or software executed by a controller, a microprocessor or other computing device. When various aspects of the embodiments of the present disclosure are illustrated or described into block diagrams, flow charts, or other graphical representations, it would be understood that the blocks, apparatus, system, technique or method described here may be implemented, as non-restrictive examples, in hardware, software, firmware, dedicated circuit or logic, common hardware or controller or other computing device, or some combinations thereof.

Besides, each block in the flowchart may be regarded as a method step and/or an operation generated by operating computer program code, and/or understood as a plurality of coupled logic circuit elements performing relevant functions. For example, the embodiments of the present disclosure include a computer program product that includes a computer program tangibly embodied on a machine-readable medium, which computer program includes program code configured to implement the method described above.

In the context of the present disclosure, a machine-readable medium may be any tangible medium including or storing a program for or about an instruction executing system, apparatus or device. The machine-readable medium may be a machine-readable signal medium or machine-readable storage medium. The machine-readable medium may include, but not limited to, electronic, magnetic, optical, electro-magnetic, infrared, or semiconductor system, apparatus or device, or any appropriate combination thereof. More detailed examples of the machine-readable storage medium include, an electrical connection having one or more wires, a portable computer magnetic disk, hard drive, random-access memory (RAM), read-only memory (ROM), erasable programmable read-only memory (EPROM or flash memory), optical storage device, magnetic storage device, or any appropriate combination thereof.

The computer program code for implementing the method of the present disclosure may be written with one or more programming languages. These computer program codes may be provided to a general-purpose computer, a dedicated computer or a processor of other programmable data processing apparatus, such that when the program codes are executed by the computer or other programmable data processing apparatus, the functions/operations prescribed in the flowchart and/or block diagram are caused to be implemented. The program code may be executed completely on a computer, partially on a computer, partially on a computer as an independent software packet and partially on a remote computer, or completely on a remote computer or server.

Besides, although the operations are depicted in a particular sequence, it should not be understood that such operations are completed in a particular sequence as shown or in a successive sequence, or all shown operations are executed so as to achieve a desired result. In some cases, multi-task or parallel-processing would be advantageous. Likewise, although the above discussion includes some specific implementation details, they should not be explained as limiting the scope of any invention or claims, but should be explained as a description for a particular embodiment of a particular invention. In the present specification, some features described in the context of separate embodiments may also be integrated into a single embodiment. On the contrary, various features described in the context of a single embodiment may also be separately implemented in a plurality of embodiments or in any suitable sub-group.

Various amendments and alterations to the exemplary embodiments of the present disclosure as above described would become apparent to a person skilled in the relevant art when viewing the above description in connection with the drawings. Any and all amendments still fall within the scope of the non-limiting exemplary embodiments of the present disclosure. Besides, the above description and drawings offer an advantage of teaching, such that technicians relating to the technical field of these embodiments of the present disclosure would envisage other embodiments of the present disclosure as expounded here.

It would be appreciated that the embodiments of the present disclosure are not limited to the specific embodiments as disclosed, and the amendments and other embodiments should all be included within the appended claims. Although particular terms are used herein, they are used only in their general and descriptive sense, rather than for the purpose of limiting.

What is claimed is:

1. A method for extending a cache of a storage system, the method comprising:
   obtaining information on data stored in the storage system having an access frequency higher than a predetermined threshold by one or more of a plurality of clients of the storage system, the plurality of clients being remote from the storage system, wherein the obtained information on data frequently accessed by the plurality of clients is obtained from an entity for monitoring access of the plurality of clients to data in the storage system;
   determining, based on the obtained information, storage information related to storage of cacheable data in the storage system, wherein the cacheable data comprises a set of the data having the access frequency higher than the predetermined threshold by the one or more of the plurality of clients, wherein the storage information includes:
      an identity of a logical unit in the storage system used to store the data; and
      a range of addresses in the logical unit used to store the data;
   synchronizing the storage information, using centralized scheduling, amongst the plurality of clients wherein each respective client of the plurality of clients locally caches, based on the storage information, the data having the access frequency higher than the predetermined threshold by that respective client, wherein locally caching includes placing the data having the access frequency higher than the predetermined threshold by that respective client in a cache that is local to that respective client; and
   the entity monitoring access of the plurality of clients to data in the storage system, the entity thereby learning characteristics of access-related data and usage of data, wherein the entity is a plugin operating within a virtual machine management module operating on a remote server configured to perform unified management of the plurality of clients.

2. The method according to claim 1, further comprising:
   receiving a modification notification message from the entity, the modification notification message indicating a subset of the cacheable data has been modified;
   identifying clients of the plurality of clients sharing the subset of the data; and
   forwarding the modification notification message to the identified clients.

3. The method according to claim 1, further comprising:
   obtaining information from the entity related to new data in the storage system having an access frequency higher than a predetermined threshold by one of the plurality of clients; and
   updating the storage information with the new data.

4. The method according to claim 1 wherein learning characteristics of access-related data includes learning a type of data and content of data.

5. A data storage apparatus comprising:
   persistent data storage; and
   processing circuitry coupled to memory configured to extend a cache beyond the data storage apparatus by:
      obtaining information on data stored in the persistent data storage having an access frequency higher than a predetermined threshold by one or more of a plurality of clients of the data storage apparatus, the plurality of clients being remote from the data storage apparatus, wherein the obtained information on data frequently accessed by the plurality of clients is obtained from an entity for monitoring access of the plurality of clients to data in the storage system;

determining, based on the obtained information, storage information related to storage of cacheable data in the persistent data storage, wherein the cacheable data comprises a set of the data having the access frequency higher than the predetermined threshold by the one or more of the plurality of clients, wherein the storage information includes:

an identity of a logical unit in the persistent data storage used to store the data; and a range of addresses in the logical unit used to store the data; and synchronizing the storage information, using centralized scheduling, amongst the plurality of clients wherein each respective client of the plurality of clients locally caches, based on the storage information, the data having the access frequency higher than the predetermined threshold by that respective client, wherein locally caching includes placing the data having the access frequency higher than the predetermined threshold by that respective client in a cache that is local to that respective client;

wherein the entity is configured to monitor access of the plurality of clients to data in the storage system, the entity thereby learning characteristics of access-related data and usage of data, wherein the entity is a plugin operating within a virtual machine management module operating on a remote server configured to perform unified management of the plurality of clients.

6. The data storage apparatus according to claim 5 wherein learning characteristics of access-related data includes learning a type of data and content of data.

7. The data storage apparatus according to claim 5, wherein the processing circuitry coupled to memory is further configured to extend the cache beyond the data storage apparatus by:

receiving a modification notification message from the entity, the modification notification message indicating a subset of the cacheable data has been modified;

identifying clients of the plurality of clients sharing the subset of the data; and forwarding the modification notification message to the identified clients.

8. The data storage apparatus according to claim 5, wherein the processing circuitry coupled to memory is further configured to extend the cache beyond the data storage apparatus by:

obtaining information from the entity related to new data in the storage system having an access frequency higher than a predetermined threshold by one of the plurality of clients; and updating the storage information with the new data.

9. A computer program product comprising a non-transitory computer-readable storage medium storing instructions, which, when performed by processing circuitry of a data storage apparatus having persistent data storage, cause the data storage apparatus to extend a cache beyond the data storage apparatus by:

obtaining information on data stored in the persistent data storage having an access frequency higher than a predetermined threshold by one or more of a plurality of clients of the data storage apparatus, the plurality of clients being remote from the data storage apparatus, wherein the obtained information on data frequently accessed by the plurality of clients is obtained from an entity for monitoring access of the plurality of clients to data in the storage system;

determining, based on the obtained information, storage information related to storage of cacheable data in the persistent data storage, wherein the cacheable data comprises a set of the data having the access frequency higher than the predetermined threshold by the one or more of the plurality of clients, wherein the storage information includes:

an identity of a logical unit in the persistent data storage used to store the data; and a range of addresses in the logical unit used to store the data; and synchronizing the storage information, using centralized scheduling, amongst the plurality of clients wherein each respective client of the plurality of clients locally caches, based on the storage information, the data having the access frequency higher than the predetermined threshold by that respective client, wherein locally caching includes placing the data having the access frequency higher than the predetermined threshold by that respective client in a cache that is local to that respective client;

wherein the entity is configured to monitor access of the plurality of clients to data in the storage system, the entity thereby learning characteristics of access-related data and usage of data, wherein the entity is a plugin operating within a virtual machine management module operating on a remote server configured to perform unified management of the plurality of clients.

10. The computer program product according to claim 9 wherein learning characteristics of access-related data includes learning a type of data and content of data.

11. The computer program product according to claim 9, wherein the instructions, when performed by the processing circuitry, further cause the data storage apparatus to:

receive a modification notification message from the entity, the modification notification message indicating a subset of the cacheable data has been modified;

identify clients of the plurality of clients sharing the subset of the data; and forward the modification notification message to the identified clients.

12. The computer program product according to claim 9, wherein the instructions, when performed by the processing circuitry, further cause the data storage apparatus to:

obtain information from the entity related to new data in the storage system having an access frequency higher than a predetermined threshold by one of the plurality of clients; and update the storage information with the new data.

* * * * *